United States Patent [19]
Imai

[11] Patent Number: 6,035,068
[45] Date of Patent: *Mar. 7, 2000

[54] METHOD AND APPARATUS FOR PROCESSING COMPRESSED DATA AND NON-COMPRESSED DATA

[75] Inventor: Toru Imai, Kanagawa, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/709,120

[22] Filed: Sep. 6, 1996

[30] Foreign Application Priority Data

Sep. 7, 1995 [JP] Japan ................. P07-230121

[51] Int. Cl.$^7$ .................................................. G06K 9/36
[52] U.S. Cl. ........................ 382/232; 382/244; 382/248
[58] Field of Search ..................... 382/232, 244, 382/248; 341/55, 106, 60; 358/261.3, 432; 380/18, 55; 434/315, 316; 395/114, 888; 364/715.02

[56] References Cited

U.S. PATENT DOCUMENTS 3,830,966 8/1974 Aldrich et al. .................. 358/261.3
5,155,484 10/1992 Chambers, IV ..................... 341/55

Primary Examiner—Jose L. Couso
Assistant Examiner—Anh Hong Do
Attorney, Agent, or Firm—Foley & Lardner

[57] ABSTRACT

A data processing scheme capable of realizing both the reduction of an amount of data due to the compression and the shortening of a time required to refer to data, as well as the lowering of the power consumption in a portable information device. A compression start position is detected, and data subsequent to the compression start position are compressed, and then a data sequence is generated from data prior to the compression start position and subsequent compressed data. In a case of reading a data sequence containing non-compressed data and subsequent compressed data, a boundary position between the non-compressed data and the compressed data is detected, and only the compressed data subsequent to the boundary position is expanded. In a case of reading data sequence containing compressed data in at least two segments which are separately compressed, only the compressed data in a top segment are expanded, and a data sequence is generated from expanded top segment data and compressed data in subsequent segments.

27 Claims, 11 Drawing Sheets

2. TELECOM'95 に出展した

METHOD AND APPARATUS FOR PROCESSING COMPRESSED DATA AND NON-COMPRESSED DATA

BACKGROUND OF THE INVENTION

1. Field of the Invention

The present invention relates to a method and an apparatus for data processing, and more particularly, to a method and an apparatus for processing data including compressed data and non-compressed data.

2. Description of the Background Art

In general, in a computer system, the data compression is utilized at a time of transferring or storing data for the purpose of shortening a transfer time or saving a memory medium. Compressed data usually form a sequence different from original data, and can be restored into totally or almost equivalent form as the original data by an expansion which is an inverse conversion of the compression.

Conventionally, the entire data to be transferred or stored are compressed in order to take a full advantage of the effect achieved by the compression. Here, there are cases in which the entire data are compressed collectively, as well as cases in which the compression is carried out in units of a plurality of fixed length blocks.

However, in a case of compressing the entire data collectively, a considerable time is required for restoring the original data by expanding the compressed data. In particular, under the interactive data utilization environment in which a user interactively selects data to be referred on a display screen, which data is going to be referred when is not known in advance, so that the expansion processing can be applied only after a desired data is requested by a user. Consequently, whenever a user requests to refer to a data, a user is going to be kept awaiting for a considerable amount of time.

Also, in a computer system for which a battery power consumption can potentially be a problem as in a case of a portable information device, the battery power can be largely consumed by a time required for the expansion processing, and this fact can make it difficult to use such a computer system over an extended period of time.

Thus, conventionally, the compression for the purpose of reducing an amount of data can shorten a transfer time or save a memory medium, but a considerable amount of time is required for restoring data in usable form because the expansion is necessary at a time of referring to data, and a considerable battery power consumption is required for referring to data many times in a portable information processing device.

SUMMARY OF THE INVENTION

It is therefore an object of the present invention to provide a method and an apparatus for data processing, capable of realizing both the reduction of an amount of data due to the compression and the shortening of a time required to refer to data, as well as the lowering of the power consumption in a portable information device.

According to one aspect of the present invention there is provided a data processing apparatus, comprising: detection means for detecting a compression start position to start compressing data in a first data sequence; compression means for compressing data subsequent to the compression start position detected by the detection means in the first data sequence; and generation means for generating a second data sequence from data prior to the compression start position detected by the detection means and subsequent data compressed by the compression means.

According to another aspect of the present invention there is provided a data processing apparatus, comprising: input means for reading a data sequence containing non-compressed data and compressed data subsequent to the non-compressed data from a memory; detection means for detecting a boundary position between the non-compressed data and the compressed data in the data sequence read by the input means; and expansion means for expanding only the compressed data subsequent to the boundary position detected by the detection means in the data sequence read by the input means.

According to another aspect of the present invention there is provided a data processing apparatus, comprising: input means for reading a first data sequence containing compressed data in at least two segments which are separately compressed; expansion means for expanding only the compressed data in a top segment of the first data sequence read by the input means; and generation means for generating a second data sequence from top segment data expanded by the expansion means and compressed data in subsequent segments of the first data sequence.

According to another aspect of the present invention there is provided a data processing system, comprising: first detection means for detecting a compression start position to start compressing data in a first data sequence; compression means for compressing data subsequent to the compression start position detected by the first detection means in the first data sequence; generation means for generating a second data sequence from data prior to the compression start position detected by the first detection means and subsequent data compressed by the compression means; a memory for storing the second data sequence generated by the generation means; input means for reading the second data sequence stored in the memory; second detection means for detecting a boundary position between non-compressed data and compressed data in the second data sequence read by the input means; and expansion means for expanding only the compressed data subsequent to the boundary position detected by the second detection means in the second data sequence read by the input means.

According to another aspect of the present invention there is provided a data processing system, comprising: segmentation means for segmenting a first data sequence into at least two segments; compression means for compressing data of said at least two segments separately; first generation means for generating a second data sequence from compressed data of said at least two segments compressed by the compression means; transfer means for transferring the second data sequence generated by the first generation means; expansion means for expanding only the compressed data in a top segment of the second data sequence transferred by the transfer means; and second generation means for generating a third data sequence from top segment data expanded by the expansion means and compressed data in subsequent segments of the second data sequence.

According to another aspect of the present invention there is provided a data processing method, comprising the steps of: detecting a compression start position to start compressing data in a first data sequence; compressing data subsequent to the compression start position detected by the detection step in the first data sequence; and generating a second data sequence from data prior to the compression start position detected by the detection step and subsequent data compressed by the compression step.

According to another aspect of the present invention there is provided a data processing method, comprising the steps of: reading a data sequence containing non-compressed data and compressed data subsequent to the non-compressed data from a memory; detecting a boundary position between the non-compressed data and the compressed data in the data sequence read by the reading step; and expanding only the compressed data subsequent to the boundary position detected by the detection step in the data sequence read by the reading step.

According to another aspect of the present invention there is provided a data processing method, comprising the steps of: reading a first data sequence containing compressed data in at least two segments which are separately compressed; expanding only the compressed data in a top segment of the first data sequence read by the input means; and generating a second data sequence from top segment data expanded by the expansion means and compressed data in subsequent segments of the first data sequence.

According to another aspect of the present invention there is provided a data processing method, comprising the steps of: (a) detecting a compression start position to start compressing data in a first data sequence; (b) compressing data subsequent to the compression start position detected by the step (a) in the first data sequence; (c) generating a second data sequence from data prior to the compression start position detected by the step (a) and subsequent data compressed by the step (b); (d) storing the second data sequence generated by the step (c); (e) reading the second data sequence stored by the step (d); (f) detecting a boundary position between non-compressed data and compressed data in the second data sequence read by the step (e); and (g) expanding only the compressed data subsequent to the boundary position detected by the step (f) in the second data sequence read by the step (e).

According to another aspect of the present invention there is provided a data processing method, comprising the steps of: (a) segmenting a first data sequence into at least two segments; (b) compressing data of said at least two segmenting a first data sequence into at least two segments; (b) compressing data of said at least two segments separately; (c) generating a second data sequence from compressed data of said at least two segments compressed by the step (b); (d) transferring the second data sequence generated by the step (c); (e) expanding only the compressed data in a top segment of the second data sequence transferred by the step (d); and (f) generating a third data sequence from top segment data expanded by the step (e) and compressed data in subsequent segments of the second data sequence.

According to another aspect of the present invention there is provided an article of manufacture, comprising: a computer usable medium having computer readable program code means embodied therein for causing a computer to function as a data processing system, the computer readable program code means including: first computer readable program code means for causing said computer to detect a compression start position to start compressing data in a first data sequence; second computer readable program code means for causing said computer to compress data subsequent to the compression start position detected by the first computer readable program code means in the first data sequence; and third computer readable program code means for causing said computer to generate a second data sequence from data prior to the compression start position detected by the first computer readable program code means and subsequent data compressed by the second computer readable program code means.

According to another aspect of the present invention there is provided an article of manufacture, comprising: a computer usable medium having computer readable program code means embodied therein for causing a computer to function as a data processing system, the computer readable program code means including: first computer readable program code means for causing said computer to read a data sequence containing non-compressed data and compressed data subsequent to the non-compressed data from a memory; second computer readable program code means for causing said computer to detect a boundary position between the non-compressed data and the compressed data in the data sequence read by the first computer readable program code means; and third computer readable program code means for causing said computer to expand only the compressed data subsequent to the boundary position detected by the second computer readable program code means in the data sequence read by the first computer readable program code means.

According to another aspect of the present invention there is provided an article of manufacture, comprising: a computer usable medium having computer readable program code means embodied therein for causing a computer to function as a data processing system, the computer readable program code means including: first computer readable program code means for causing said computer to read a first data sequence containing compressed data in at least two segments which are separately compressed; second computer readable program code means for causing said computer to expand only the compressed data in a top segment of the first data sequence read by the first computer readable program code means; and third computer readable program code means for causing said computer to generate a second data sequence from top segment data expanded by the second computer readable program code means and compressed data in subsequent segments of the first data sequence.

Other features and advantages of the present invention will become apparent from the following description taken in conjunction with the accompanying drawings.

BRIEF DESCRIPTION OF THE DRAWINGS

FIGS. 2A and 2B are illustrations of exemplary document data used in the system of FIG. 1.

DETAILED DESCRIPTION OF THE PREFERRED EMBODIMENTS

Referring now to FIG. 1 to FIG. 7, the first embodiment of a data processing apparatus and a data processing method according to the present invention will be described in detail.

Figure 1:
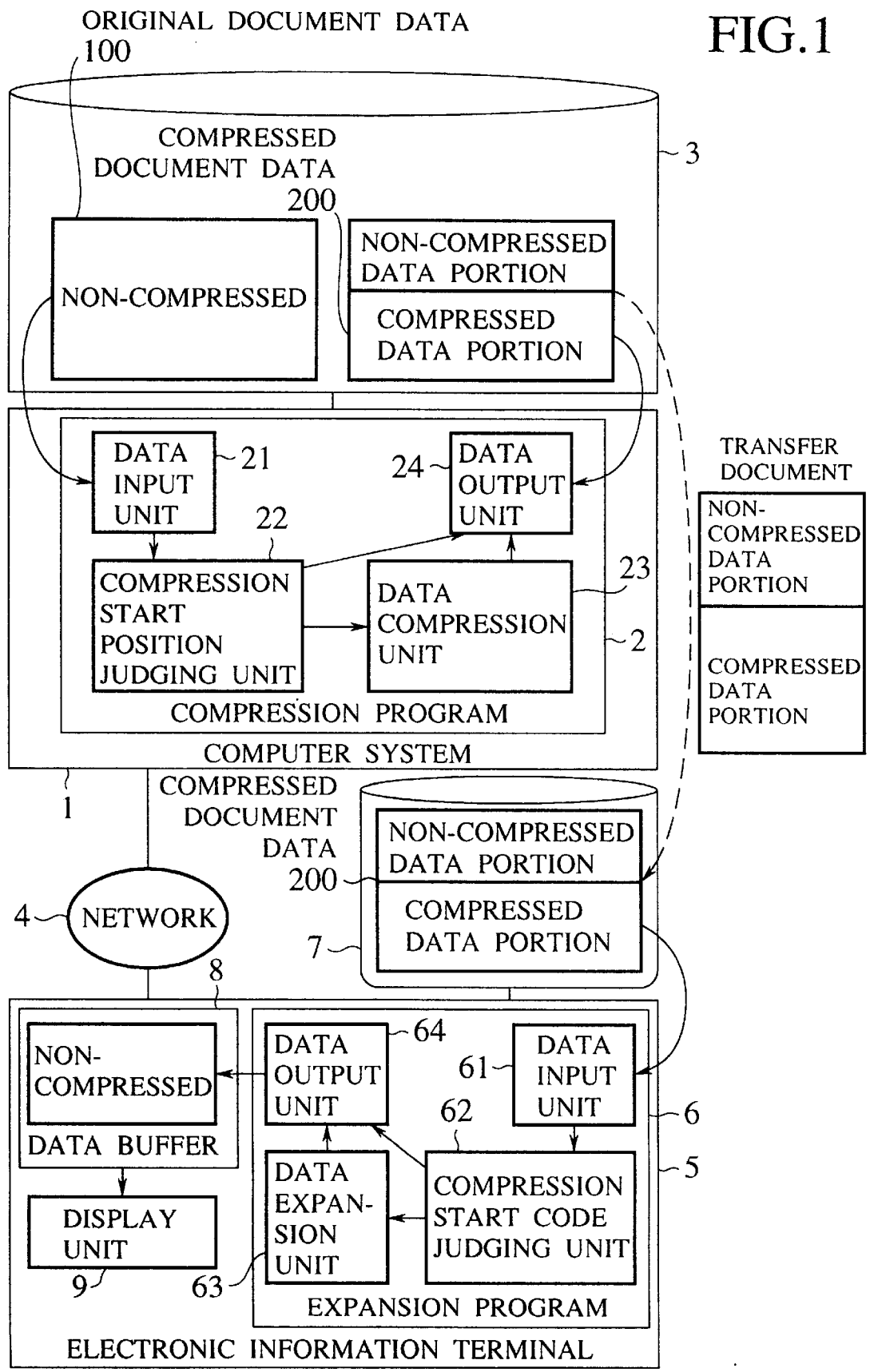
FIG. 1 is a block diagram of a computer network system incorporating a data processing apparatus in the first embodiment of the present invention.

FIG. 1 shows a configuration of a computer network system constructed by utilizing a data processing apparatus of this first embodiment. In this computer network system, data such as document data are produced by a computer system 1 provided at a software vendor, etc., and these data are distributed to an electronic information terminal 5 used by a general user, via a communication through a network 4 or a memory medium such as CD-ROM.

The computer system 1 is a server computer for providing various information and service to a user, and data such as document data to be distributed to a user are produced in this computer system 1. In this case, the document data are sent to a user after a compression processing by a compression program 2 executed on a CPU of the computer system 1 is applied.

This compression program 2 generated compressed document data 200 by reading out original document data 100 from a secondary memory device 3 of the computer system 1 and applying the compression processing to the document data 100, and stores the compressed document data 200 in the secondary memory device 3. In this case, the compression processing is not applied to data at a top portion of the document data 100, but applied only to data subsequent to that at a top portion of the document data 100. Consequently, the compressed document data 200 comprises a non-compressed data portion and a compressed data portion subsequent to the non-compressed data portion as shown in FIG. 1.

The compressed document data 200 is used as a transfer document to be distributed to a general user. Namely, the compressed document data 200 are distributed to a general user via a communication through the network 4 or a memory medium such as CD-ROM, and then stored in a secondary memory device 7 of the electronic information terminal 5 used by that user.

The electronic information terminal 5 is an information device such as a sub-note personal computer or an electronic memo. At this electronic information terminal 5, in a case of referring to a document in the compressed document data 200 stored in the secondary memory device 7 by displaying it on a display unit 9, an expansion processing by an expansion program 6 executed on a CPU of the electronic information terminal 5 is applied. In this case, the expansion processing is not applied to the non-compressed data portion of the compressed document data 200, but applied only to the compressed data portion of the compressed document data 200.

Next, a functional configuration of the compression program 2 executed on the computer system 1 will be described. As shown in FIG. 1, this compression program 2 includes a data input unit 21, a compression start position judging unit 22, a data compression unit 23, and a data output unit 24.

The data input unit 21 sequentially reads out a file of the document data 100 which are not compression processed from the secondary memory device 3 in units of prescribed blocks, and gives the read out document data 100 to the compression start position judging unit 22. The compression start position judging unit 22 detects a position to start the compression within a data sequence of the document data 100, and sends data prior to the detected compression start position to the data output unit 24 while sending data subsequent to the detected compression start position to the data compression unit 23. The compression unit 23 compresses data received from the compression start position judging unit 22, and gives the compressed data to the data output unit 24.

The data output unit 24 composes the compressed data and the non-compressed data by attaching the compressed data received from the data compression unit 23 behind the non-compressed data received from the compression start position judging unit 22 so as to generate a data sequence formed by the non-compressed data portion and the compressed data portion, and stores this data sequence as a file of the compressed document data 200 in the secondary memory device 3.

Figure 3:
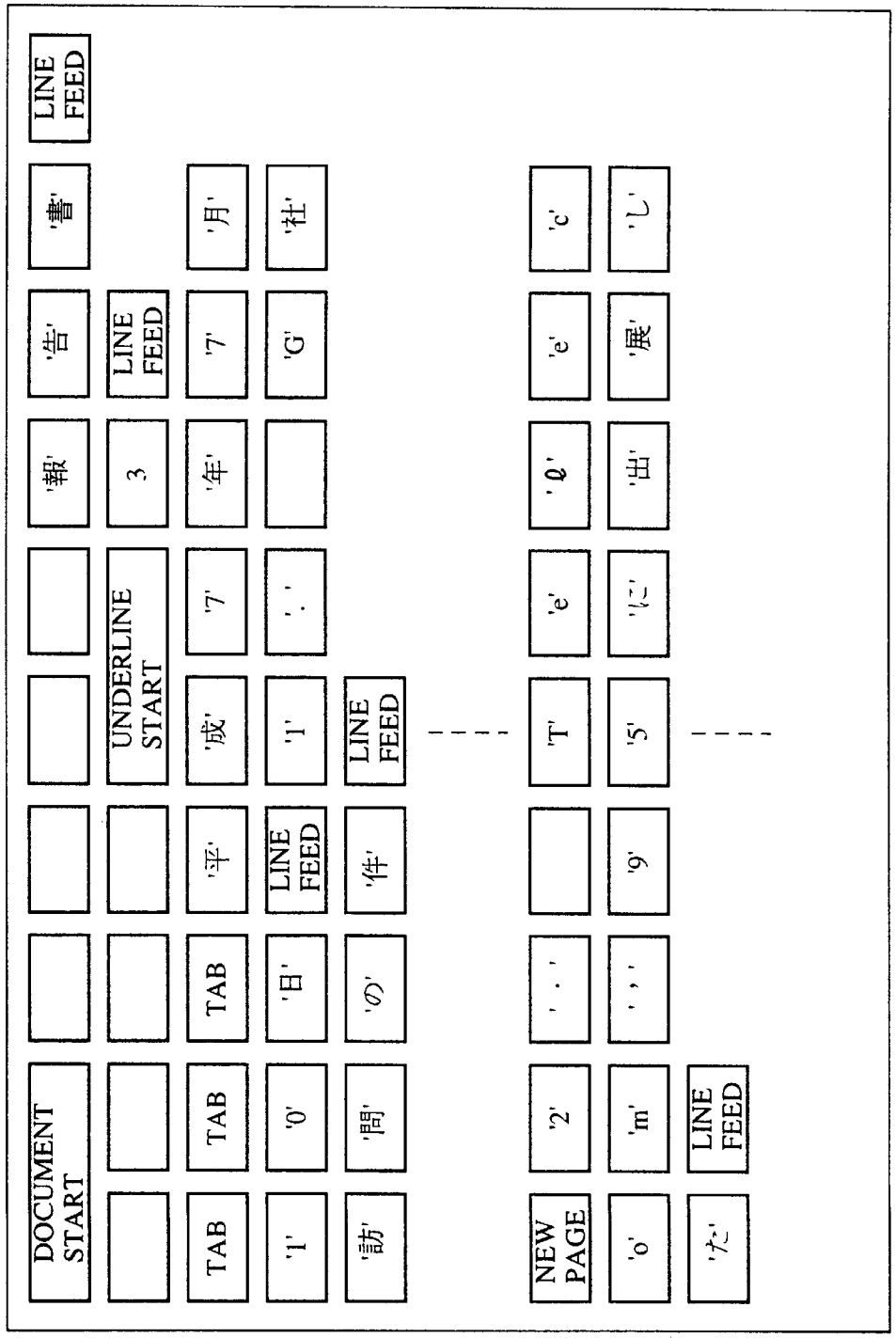
FIG. 3 is an illustration of an exemplary internal code structure of the document data of FIGS. 2A and 2B.

FIGS. 2A and 2B show one example of the document data 100 (in Japanese) used in this embodiment. Here, the document data 100 comprise two pages shown in FIGS. 2A and 2B. FIG. 3 shows an exemplary internal code structure of the document data 100 of FIGS. 2A and 2B. In general, the document includes not just text but also underlines, ruled lines, special symbols, etc., and there can be a case where the document also includes images.

In this embodiment, the data sequence of the document data 100 starts from a document start code, which is followed by blank, character, line feed, blank, underline start, a number of characters to be underlined, line feed, tab, and so on. At a position where a new page begins, a new page code is entered.

In a case of dealing with such document data 100, it is preferable for the compression start position judging unit 22 to detect a new page code contained within the data sequence of the document data 100 as the compression start position. In this case, the compression processing is not applied to the first page of the document data 100 shown in FIG. 2A, and only data of the second page shown in FIG. 2B and any subsequent data are compressed. In general, the document data are often utilized in a manner of glancing at the first page alone for the purpose of confirming its content. For this reason, by using the a new page code as the compression start position, data which have a high probability for being frequently requested as a referencing target can be maintained in a non-compressed state.

Figure 4:
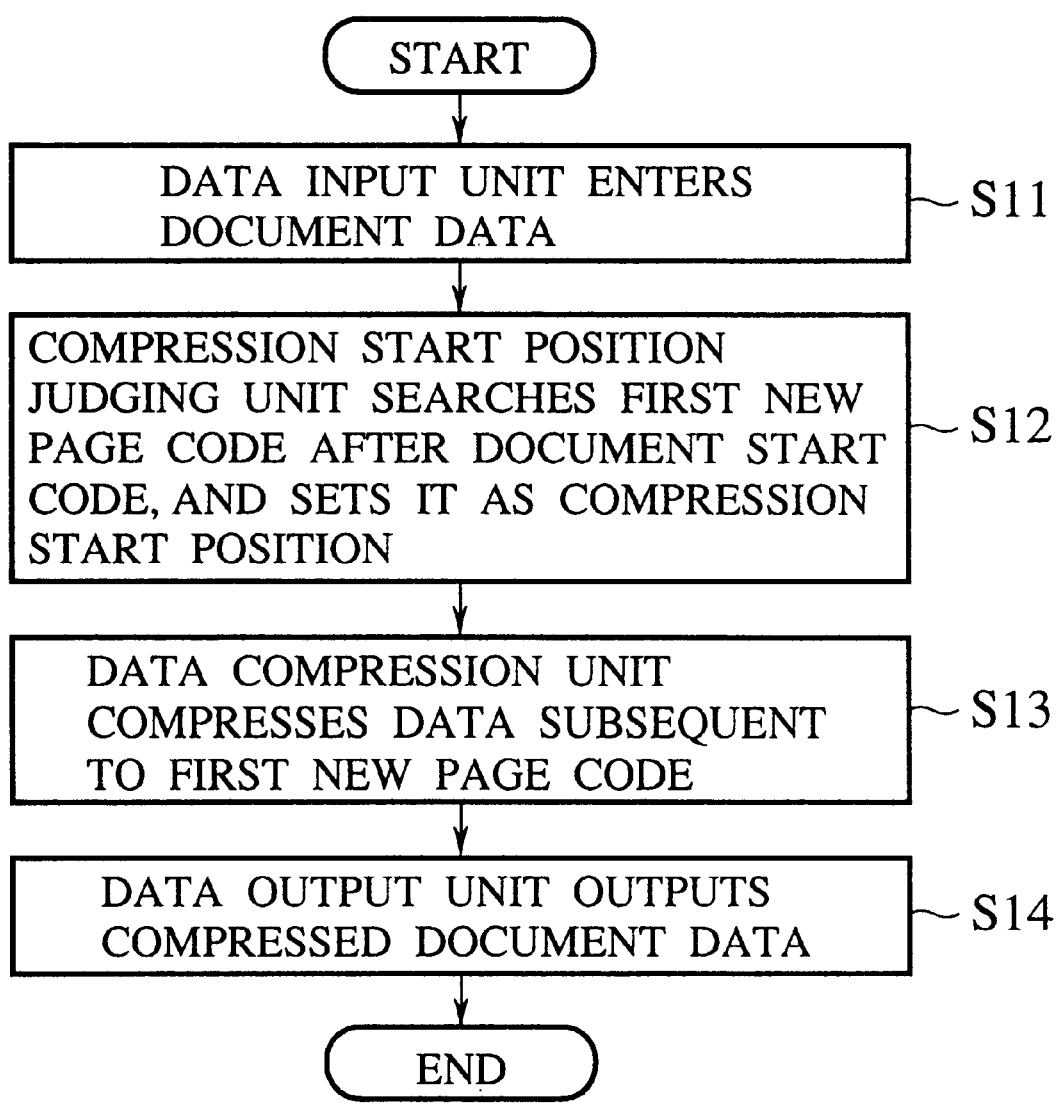
FIG. 4 is a flow chart for a procedure of the compression processing by the compression program in the system of FIG. 1.

Next, with reference to the flow chart of FIG. 4, a procedure of the compression processing by the compression program 2 will be described. Here, a procedure of the compression processing for an exemplary case of compressing only second and subsequent pages without compressing the first page of the document data 100.

First, the data input unit 21 enters the document data 100 in a structure shown in FIG. 3 (step S11). Next, the compression start position judging unit 22 searches the first new page code after the document start code, and sets a position of the first new page code as the compression start position (step S12). In this case, the compression start position judging unit 22 sends data prior to the first new page code to the data output unit 24, while sending data subsequent to the first new page code to the data compression unit 23.

Then, the data compression by the data compression unit 23 is started, and the compression processing of the data subsequent to the first new page code is carried out (step S13). Next, the data output unit 24 generates the compressed document data 200 composed from the compressed data and the non-compressed data by attaching the compressed data received from the data compression unit 23 behind the non-compressed data received from the compression start position judging unit 22, and stores the generated compressed document data 200 in the secondary memory device 3 (step S14).

Figure 5:
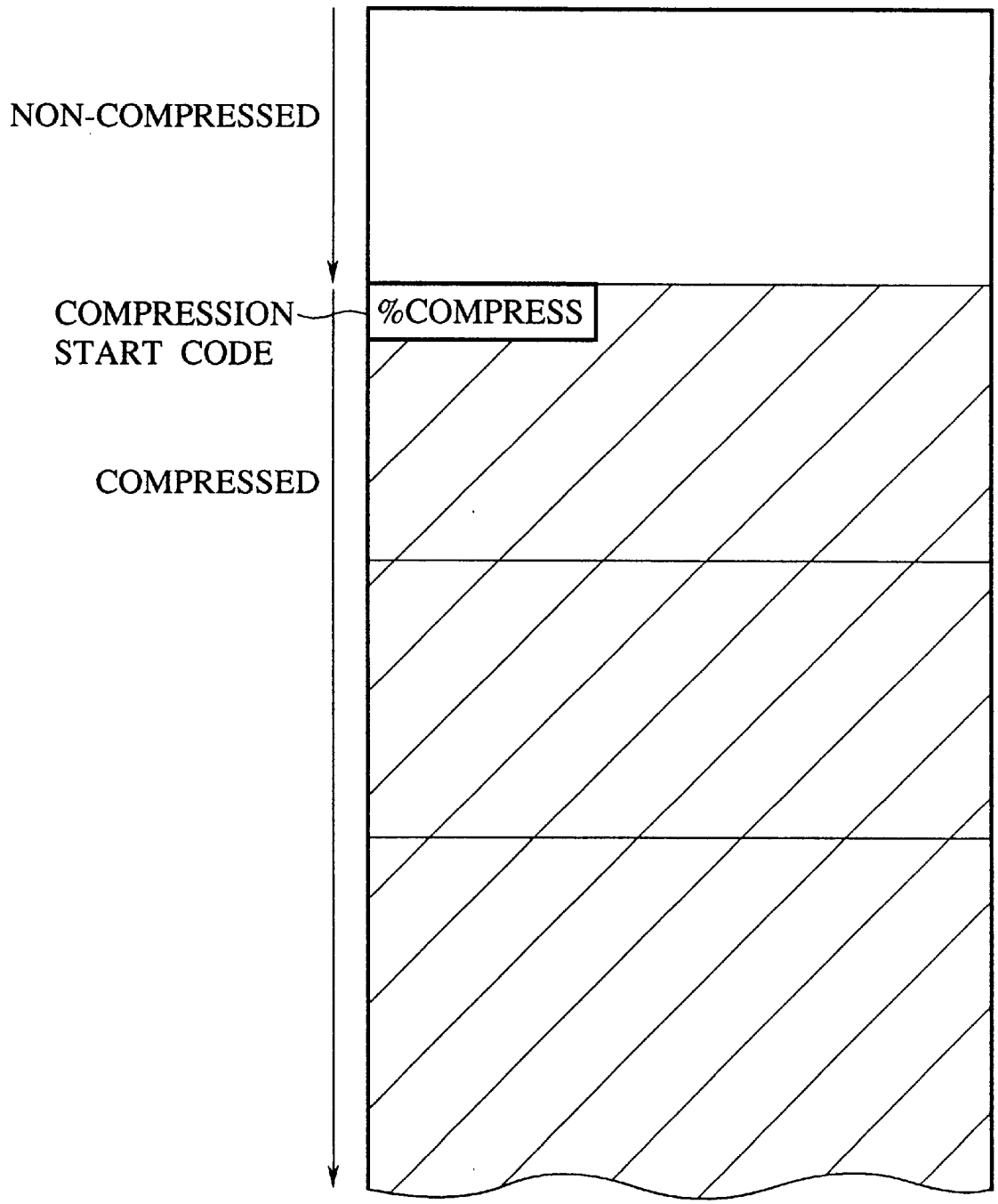
FIG. 5 is an illustration of exemplary compressed document data obtained by the procedure of FIG. 4.

At a time of composing the non-compressed data and the compressed data, as shown in FIG. 5, a compression start code (%COMPRESS) is attached at a top of the compression data. This compression start code is utilized in detecting a range for applying the expansion at a time of data reading.

The compressed document data 200 generated in this manner are either distributed to a user by being stored in a memory medium such as CD-ROM, or as the transfer document data to be transmitted to a user through the network 4.

A portion prior to the first new page code in the compression document data 200 is not compressed, and only a portion subsequent to the first new page code is compressed, so that the expansion is not necessary in a case of referring only to the first page at the user's electronic information device 5, and therefore the data can be referred quickly. Also, a portion subsequent to the first new page code is compressed so that a size of the document data as a whole can be made small. In the example described above, the document data comprising only two pages has been described for the sake of simplicity, but a document comprises many pages in general, and the effect concerning the reduction of the document data size can be achieved even when only the second and subsequent pages are compressed.

Also, the compression start position is set at a position of a prescribed new page code in the above, but it is also possible to use a position which is a prescribed number of bytes from a top of the document data as the compression start position, for example, in a case of compressing the document data without a new page code for the purpose of pagination.

In such a case, the compression start position judging unit 22 counts a data size in the data sequence of the document data 100 entered by the data input unit 21, and a data position which is a prescribed size from a top of the data sequence of the document 100 is detected as the compression start position. Note that, in a case of using a data size for the purpose of determining the compression start position in this manner, it is possible to realize schemes other than that for leaving only the first page of the document data 100 in a non-compressed state, such as a scheme for leaning first several pages in a non-compressed state or a scheme for starting the data compression in a middle of the first page.

Next, a functional configuration of the expansion program 6 executed on the electronic information terminal 5 used by a user will be described. As shown in FIG. 1, this expansion program 6 includes a data input unit 61, a compression start code judging unit 62, a data expansion unit 63, and a data output unit 64.

Figure 6:
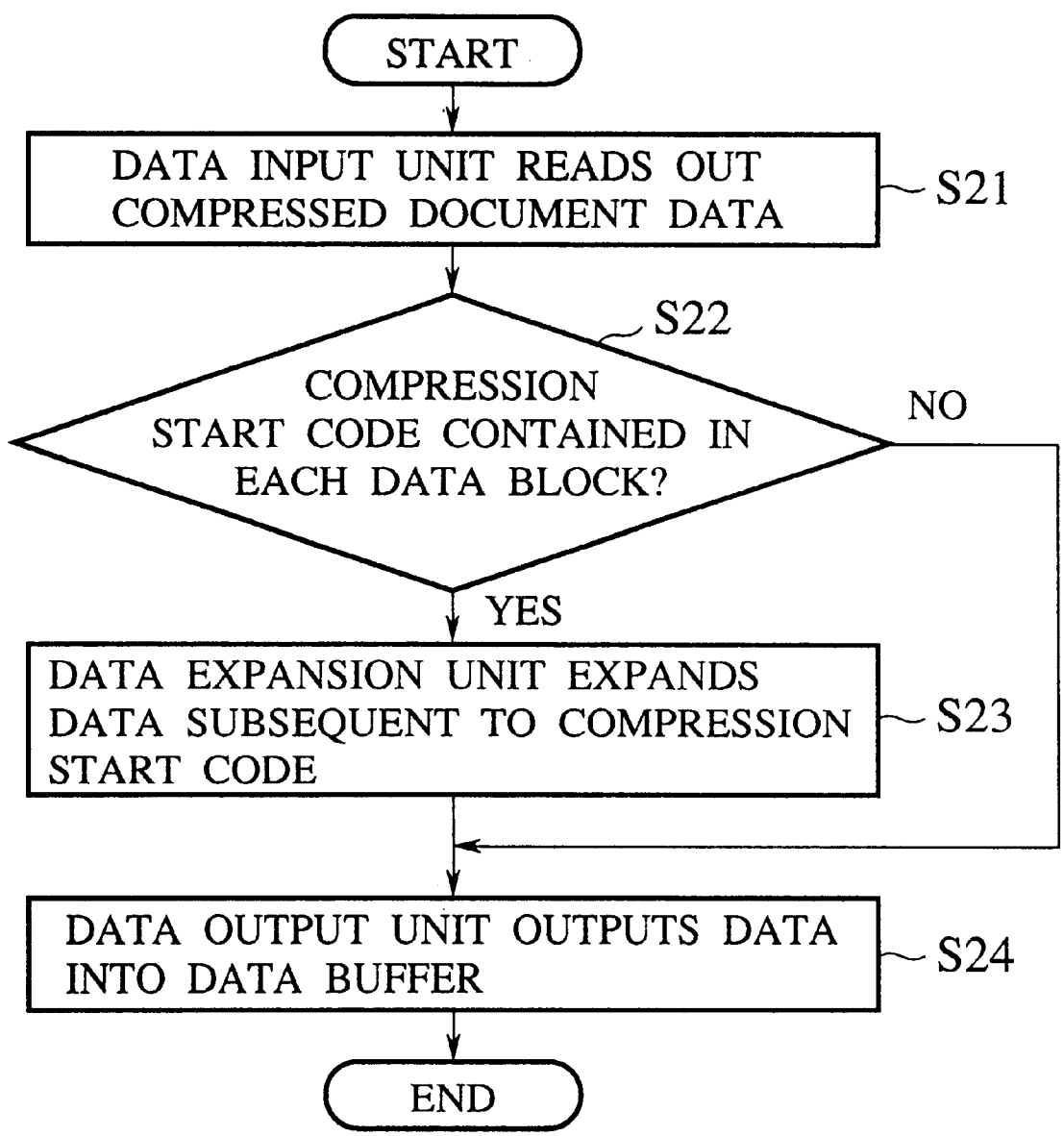
FIG. 6 is a flow chart for one possible procedure of the expansion processing by the expansion program in the system of FIG. 1.

This expansion program 6 carries out the expansion processing of the compressed document data 200 according to a procedure of FIG. 6, when a data referencing (reading) request is issued by a user.

First, according to a file reading request from a user, the data input unit 61 sequentially reads out a file of the compressed document data 200 produced by the computer system 1 from the secondary memory device 7 of the electronic information terminal 5 in units of prescribed blocks, and gives the read out compressed document data 200 to the compression start code judging unit 62 (step S21). Next, the compression start code judging unit 62 searches for the compression start code in the data block of the compressed document data 200 entered by the data input unit 61, and judges whether the compression start code is contained in each data block or not (step S22).

When the compression start code is not contained, the data block entered from the data input unit 61 is judged as a data prior to a boundary position between the non-compressed data and the compressed data, and this data is directly sent from the compression start code judging unit 62 to the data output unit 64. Then, the data output unit 64 writes the data received from the compression start code judging unit 62 into a data buffer 8 (step S24).

On the other hand, when the compression start code is contained, the data block entered from the data input unit 61 is judged as containing a data subsequent to a boundary position between the non-compressed data and the compressed data. Then, the data prior to the compression start code is sent to the data output unit 64, while the data subsequent to the compression start code is sent from the compression start code judging unit 62 to the data expansion unit 63, and expanded at the data expansion unit 63 (step S23). Then, the expanded data is given to the data output unit 64. The data output unit 64 writes the data received from the data expansion unit 63 into the data buffer 8, in succession to the data received from the compression start code judging unit 62 (step S24).

By this processing, in the data buffer 8, the data sequence in a non-compressed state is sequentially developed, and a screen display of the document data by the display unit 9 is started at a point where all the data of the first page are developed in the data buffer 8. Then, while a user is referring to the data of the first page on the display screen, the data expansion processing for the second and subsequent pages is carried out and the expanded data are developed in the data buffer 8.

Next, with reference to the flow chart of FIG. 7, the second example of the expansion processing executed by the expansion program 6 will be described.

Figure 7:
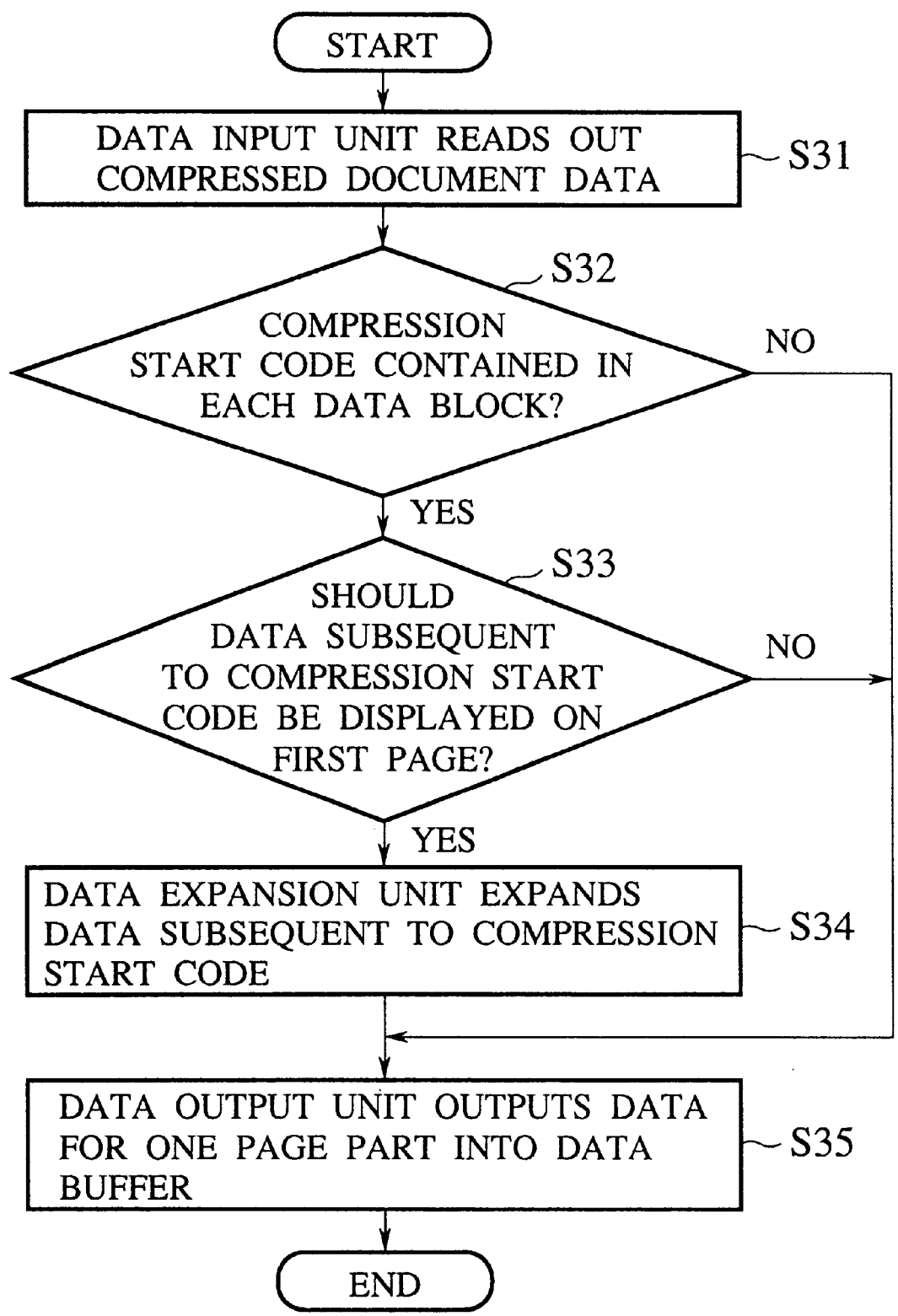
FIG. 7 is a flow chart for another possible procedure of the expansion processing by the expansion program in the system of FIG. 1.

Namely, a procedure of FIG. 6 described above is directed to an exemplary case of reading all pages of the compressed document data 200, while this second example of the expansion processing of FIG. 7 is directed to a case of displaying only the first page of the compressed document data 200 quickly. In this case, in order to account for both a case of determining the compression start position according to a new page code and a case of determining the compression start position according to a prescribed data size, whether the expansion processing is necessary or not is determined according to whether the compressed data is included among data of the first page or not.

First, according to a file reading request from a user, the data input unit 61 sequentially reads out a file of the compressed document data 200 produced by the computer system 1 from the secondary memory device 7 of the electronic information terminal 5 in units of prescribed blocks, and gives the read out compressed document data 200 to the compression start code judging unit 62 (step S31). Next, the compression start code judging unit 62 searches for the compression start code in the data block of the compressed document data 200 entered by the data input unit 61, and judges whether the compression start code is contained in each data block or not (step S32).

When the compression start code is not contained, the data block entered from the data input unit 61 is judged as a data prior to a boundary position between the non-compressed data and the compressed data, and this data is directly sent from the compression start code judging unit 62 to the data output unit 64. Then, the data output unit 64 sequentially writes the data received from the compression start code judging unit 62 into the data buffer 8, until data for one page part are stored in the data buffer 8 (step S35).

On the other hand, when the compression start code is contained, the data block entered from the data input unit 61 is judged as containing a data subsequent to a boundary position between the non-compressed data and the compressed data, in this case, the compression start code judging unit 62 judges whether data subsequent to the compression start code in that data block which contains the compression start code is a data to be displayed on the first page or not (step S33). This judgement can be made by comparing a prescribed data size for one page part with a total data size of the data prior to the compression start code entered from the data input unit 61, for example.

When the data subsequent to the compression start code is not a data to be displayed on the first page, only the data prior to the compression start code is sent from the compression start code judging unit 62 to the data output unit 64. When the data subsequent to the compression start code is a data to be displayed on the first page, all data subsequent to that compression start code are sent from the compression start code judging unit 62 to the data expansion unit 63, and expanded by the data expansion unit 63 (step S34). Then, the expanded data are given to the data output unit 64. The data output unit 64 writes the data received from the data expansion unit 63 into the data buffer 8, until data for one page part are stored in the data buffer 8, in succession to the data received from the compression start code judging unit 62 (step S35).

By this processing, in the data buffer 8, the data sequence in a non-compressed state is developed for one page part alone, and a screen display of the document data by the display unit 9 is started at a point where all the data of the first page are developed in the data buffer 8. Therefore, when the compression start code does not exist within the data sequence to be displayed on the first page, the data of the first page can be displayed quickly without requiring the expansion processing.

Referring now to FIG. 8 to FIG. 11, the second embodiment of a data processing apparatus and a data processing method according to the present invention will be described in detail.

Figure 8:
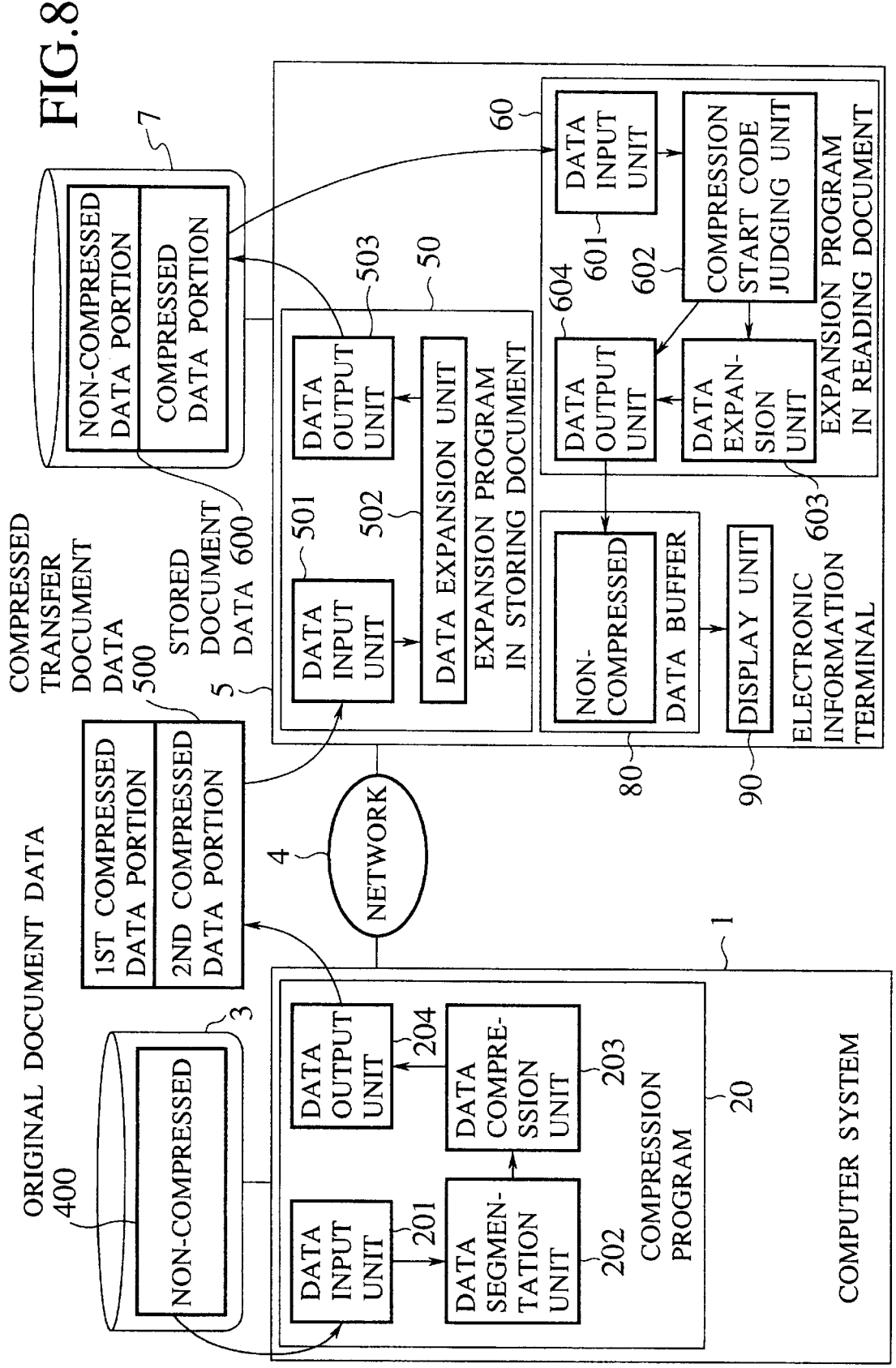
FIG. 8 is a block diagram of a computer network system incorporating a data processing apparatus in the second embodiment of the present invention.

FIG. 8 shows a configuration of a computer network system constructed by utilizing a data processing apparatus of this second embodiment. In this computer network system, data such as document data are produced by the computer system 1, and these data are distributed to the electronic information terminal 5 used by a general user, via a communication through the network 4, etc., similarly as in the first embodiment of FIG. 1.

The computer system 1 is a server computer for providing various information and service to a user, and data such as document data to be distributed to a user are produced in this computer system 1. In this case, the document data are sent to a user after a compression processing by a compression program 20 executed on a CPU of the computer system 1 is applied.

This compression program 20 generates compressed transfer document data 50 by reading out original document data 400 from the secondary memory device 3 of the computer system 1 and applying the compression processing to the document data 400, and transfers the compressed transfer document data 500 to the electronic information terminal 5 through the network 4.

In this case, the compression processing is applied separately for data of the first page of the document data 400 and data of the second and subsequent pages of the document data 400. Consequently, the compressed transfer document data 500 comprises a first compressed data portion and a second compressed data portion as shown in FIG. 8.

The compressed transfer document data 500 is sent to the electronic information terminal 5 through the network 4. In a case of storing this compressed transfer document data 500 into the secondary memory device 7 of the electronic information terminal 5, an expansion processing by an expansion program in storing document 50 executed on a CPU of the electronic information terminal 5 is applied. In this case, the expansion processing is applied only to the first compressed data portion of the compressed transfer document data 500, and not to the second compressed data portion of the compressed transfer document data 500. Consequently, a stored document data 600 stored in the secondary memory device 7 comprises a non-compressed data portion and a compressed data portion subsequent to the non-compressed data portion, as shown in FIG. 8.

A structure of this stored document data 600 in which data of the first page are in a non-compressed state and data of the second and subsequent pages are in a compressed state is the same as the compressed document data 200 of the first embodiment.

In a case of referring to this stored document data 600 by displaying it on a display unit 90, an expansion processing by an expansion program in reading document 60 executed on a CPU of the electronic information terminal 5 is applied. In this case, the expansion processing is not applied to the non-compressed data portion of the stored document data 600, but applied only to the compressed data portion of the stored document data 600. This expansion program in reading document 60 has the identical function as the expansion program 6 of the first embodiment, and includes a data input unit 601, a compression start code judging unit 602, a data expansion unit 603, and a data output unit 604, which respectively correspond to the data input unit 61, the compression start code judging unit 62, the data expansion unit 63, and the data output unit 64 constituting the expansion program 6 of the first embodiment shown in FIG. 1. Also, a data buffer 80 and a display unit 90 respectively correspond to the data buffer 8 and the display unit 9 of the first embodiment shown in FIG. 1.

Next, a functional configuration of the compression program 20 executed on the computer system 1 will be described. As shown in FIG. 8, this compression program 20 includes a data input unit 201, a data segmentation unit 202, a data compression unit 203, and a data output unit 204.

Figure 9:
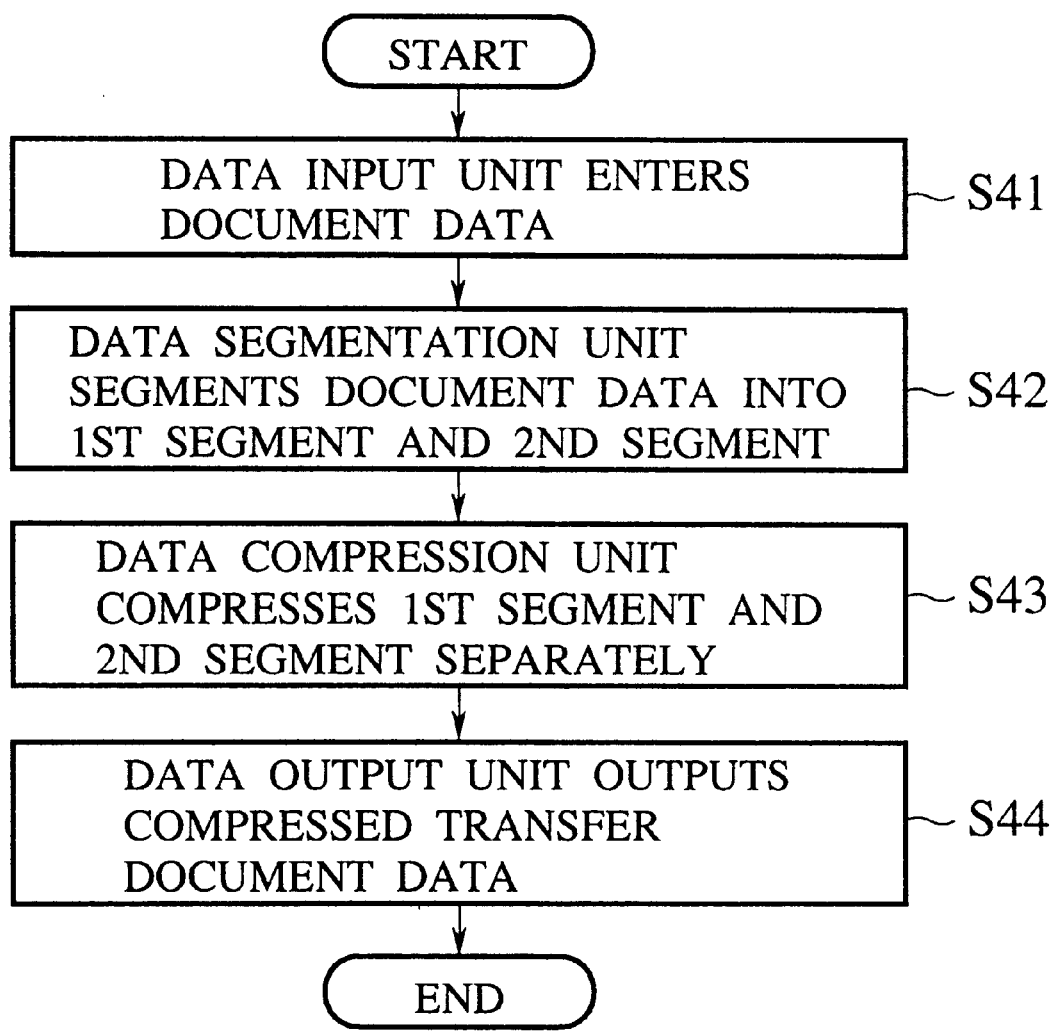
FIG. 9 is a flow chart for a procedure of the compression processing by the compression program in the system of FIG. 8.

This compression program 20 generates the compressed transfer document data 500 by a procedure of FIG. 9 as follows.

First, the data input unit 201 enters the document data 400 in a structure shown in FIG. 3 (step S41). Next, the data segmentation unit 202 searches the first new page code after the document start code, and sets data from a top to a position of the first new page code as the first segment, and subsequent data as the second segment (step S42).

Then, the data compression unit 203 applies the compression processing to the first segment and the second segment separately, and sends two sets of compressed data to the data output unit 204 (step S43). Then, the data output unit 204 generates the compressed transfer document data 500 composed from the compressed data for the first segment and the compressed data for the second segment by attaching the compressed data for the second segment behind the compressed data for the first segment, and either stores the generated compressed transfer document data 500 in the secondary memory device 3 or transfer the generated compressed transfer document data 500 to the electronic information terminal 5 through the network 4 (step S44).

Figure 10:
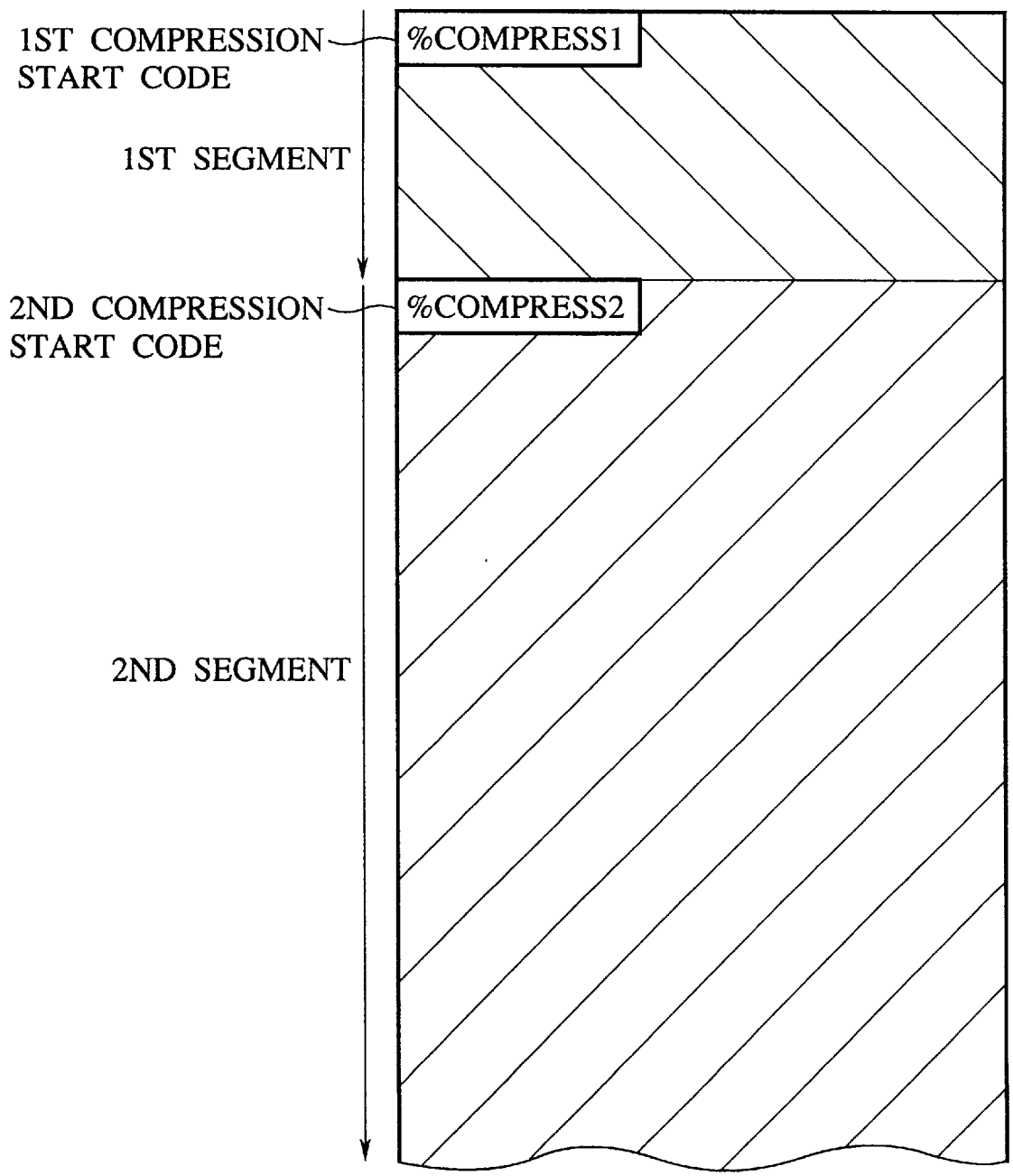
FIG. 10 is an illustration of exemplary compressed transfer document data obtained by the procedure of FIG. 9.

At a time of composing the compressed data for the first segment and the compressed data for the second segment, as shown in FIG. 10, a first compression start code (%COMPRESS1) is attached at a top of the compression data for the first segment, and a second compression start code (%COMPRESS2) is attached at a top of the compression data for the second segment. These compression start codes are utilized in detecting a range for applying the expansion at a time of data storing at the electronic information terminal 5.

Note that a position of a new page code is used as a boundary value for segmenting the document data in the above, but is also possible to use a position which is a prescribed number of bytes from a top of the document data as a boundary value for segmenting the document data, for example, in a case of compressing the document data without a new page code for the purpose of pagination, similarly as in the first embodiment.

Next, a functional configuration of the expansion program in storing document 50 executed on the electronic information terminal 5 will be described. As shown in FIG. 8, this expansion program in storing document 50 includes a data input unit 501, a data expansion unit 502, and a data output unit 503.

Figure 11:
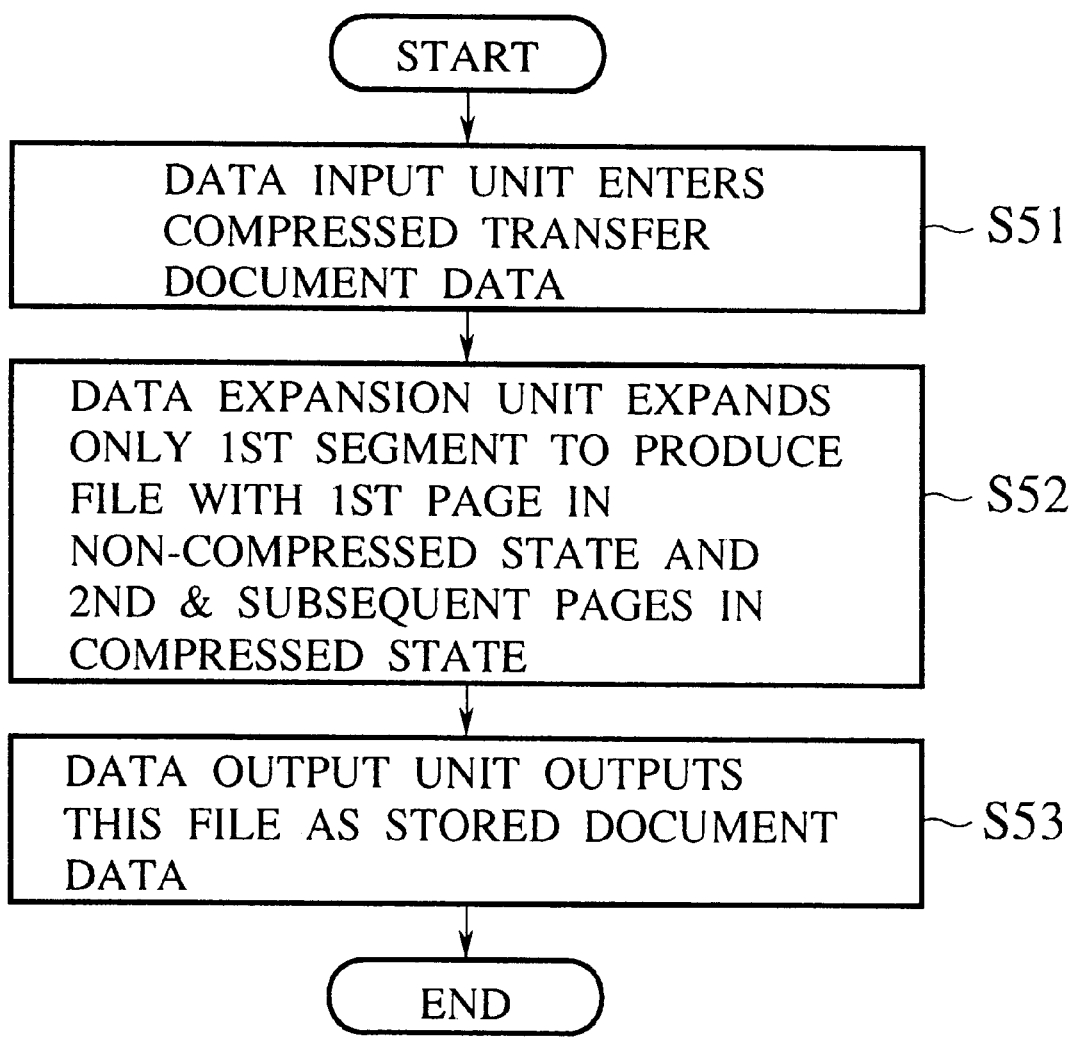
FIG. 11 is a flow chart for a procedure of the expansion processing by the expansion program in storing document in the system of FIG. 8.

This expansion program in storing document 50 converts the compressed transfer document data 500 into the stored document data 600 by a procedure of FIG. 11 as follows.

First, the data input unit 501 enters the compressed transfer document data 500 (step S51). Then, the data expansion unit 502 recognizes the data sequence enclosed between the first compression start code and the second compression start code as the compressed data for the first segment, and expands only these compressed data for the first segment, so as to produce a file in which the first page is in a non-compressed state, and the second and subsequent pages are in a compressed state (step S52). Then, the data output unit 503 stores this file as the stored document data 600 into the secondary memory device 7 (step S53).

In a case of referring to this stored document data 600 by displaying it on the display unit 90, an expansion processing by the expansion program in reading document 60 executed on a CPU of the electronic information terminal 5 is applied. In this case, the expansion processing is similar to that of the expansion program 6 shown in FIG. 6 or FIG. 7 of the first embodiment.

According to this second embodiment, two compressed data sequences obtained by segmenting the document data into two and applying the compression processing separately are given to the electronic information terminal 5 as the compressed transfer document data 500, so that an amount of data to be transferred on the network 4 or a capacity of a memory medium for data distribution such as CD-ROM can be reduced.

As described, according to the present invention, the top portion of data is stored in a non-compressed state, so that there is no need to apply the expansion processing at a time of referring to the top portion of data. Consequently, it becomes possible to refer to data quickly, and a consumption of the battery power due to the expansion can be eliminated even when data are referred many times in a portable information device. Thus, it becomes possible to realize both the reduction of an amount of data due to the compression and the shortening of a time required to refer to data, as well as the lowering of the power consumption in a portable information processing device.

It is to be noted that the first and second embodiments described above are directed to an exemplary case of using text document, but the similar effects can also be achieved by applying the similar processing to static image data or video data.

It is also possible to realize the respective functions of the compression program 2 and the expansion program 6 shown in FIG. 1 on an identical computer. Similarly, it is also possible to realize the respective functions of the compression program 20 and the expansion programs 50 and 60 shown in FIG. 8 on an identical computer. In such a case, by permanently keeping these programs for compression/expansion on a memory, it also becomes possible to realize the compression/expansion processing as described above automatically at a time of file input/output.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the compression program 2 of FIG. 1, the compression program 20 of FIG. 8, the expansion program 6 of FIG. 1, the expansion program in storing document 50 FIG. 8, and the expansion program in reading document 60 of FIG. 8 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data processing apparatus, comprising:

detection means for detecting a compression start position to start compressing data in a first data sequence, the first data sequence having a top portion and a subsequent portion, the compression start position being positioned as a boundary between the top portion and the subsequent portion;

compression means for compressing data in the subsequent portion of the first data sequence that are positioned subsequent to the compression start position detected by the detection means; and generation means for generating a second data sequence having a top portion containing data that are positioned ahead of the compression start position in a non-compressed form as contained in the top portion of the first data sequence and a subsequent portion containing subsequent data in a compressed form as compressed by the compression means.

2. The apparatus of claim 1, wherein the detection means detects the compression start position by detecting a prescribed code in the first data sequence.

3. The apparatus of claim 2, wherein the first data sequence represents document data, and the prescribed code detected by the detection means is a first new page code after a document start code in the document data.

4. The apparatus of claim 1, wherein the detection means detects the compression start position as a position which is a prescribed data size away from a top of the first data sequence.

5. A data processing apparatus, comprising:

input means for reading a data sequence having a top segment containing non-compressed data and subsequent segments containing compressed data that are positioned subsequent to the non-compressed data from a memory;

detection means for detecting a boundary position between the non-compressed data and the compressed data in the data sequence read by the input means;

expansion means for expanding only the compressed data in the subsequent segments that are positioned subsequent to the boundary positioned detected by the detection means, while leaving the non-compressed data in the top segment in a non-compressed form as contained in the data sequence read by the input means; and generation means for generating another data sequence having a top portion containing the non-compressed data that are positioned ahead of the boundary position detected by the detection means in the data sequence and a subsequent portion containing subsequent data expanded by the expansion means.

6. The apparatus of claim 5, wherein the detection means detects the boundary position by detecting a prescribed compression start code contained in the data sequence.

7. The apparatus of claim 5, wherein the data sequence represents document data, and the expansion means expands the compressed data only when data that are positioned subsequent to the boundary position detected by the detection means is judged as data to be displayed on a first page of the document data in a case of displaying the document data.

8. A data processing apparatus, comprising:

input means for reading a first data sequence containing compressed data in at least a top segment and a subsequent segment which are separately compressed;

expansion means for expanding only the compressed data in the top segment of the first data sequence read by the input means, the top segment having a top portion containing uncompressed data and a subsequent portion containing the compressed data that was expanded by the expansion means; and generation means for generating a second data sequence having a top portion containing expanded data as expanded by the expansion means and a subsequent portion containing compressed data in a compressed form as contained in the subsequent segment of the first data sequence.

9. The apparatus of claim 8, wherein the first data sequence represents document data, and the expansion means expands the compressed data in a top segment corresponding to a first page of the document data.

10. A data processing system, comprising:

first detection means for detecting a compression start position to start compressing data in a first data sequence, the first data sequence having a top portion and a subsequent portion, the compression start position being positioned as a boundary between the top portion and the subsequent portion;

compression means for compressing data in the subsequent portion of the first data sequence that are positioned subsequent to the compression start position detected by the first detection means in the first data sequence;

generation means for generating a second data sequence having a top portion containing data that are positioned ahead of the compression start position in a non-compressed form as contained in the top portion of the first data sequence and a subsequent portion containing subsequent data in a compressed form as compressed by the compression means;

a memory for storing the second data sequence generated by the generation means;

input means for reading the second data sequence stored in the memory;

second detection means for detecting a boundary position between non-compressed data and compressed data in the second data sequence read by the input means; and expansion means for expanding only the compressed data that are positioned subsequent to the boundary position detected by the second detection means, while leaving the non-compressed data in a non-compressed form as contained in the second data sequence read by the input means.

11. The system of claim 10, wherein the first detection means, the compression means, and the generation means form a first device, while the memory, the input means, the second detection means, and the expansion means form a second device which is connected with the first device through a network, and the second data sequence generated by the generation means is transferred to the memory through the network.

12. A data processing system, comprising:

segmentation means for segmenting a first data sequence into at least two segments;

compression means for compressing data of said at least two segments separately;

first generation means for generating a second data sequence containing compressed data of said at least two segments compressed by the compression means;

transfer means for transferring the second data sequence generated by the compression means;

expansion means for expanding only the compressed data in a top segment of the second data sequence transferred by the transfer means; and second generation means for generating a third data sequence having a top portion containing expanded data as expanded by the expansion means and a subsequent portion containing compressed data in a compressed form as contained in the second data sequence.

13. The system of claim 11, wherein the segmentation means, the compression means, and the first generation means form a first device, while the expansion means and the second generation means form a second device which is connected with the first device through the transfer means, and the transfer means transfers the second data sequence through a network connected between the first device and the second device.

14. The system of claim 12, further comprising:
a memory for storing the third data sequence generated by the second generation means;
input means for reading the third data sequence stored in the memory;
detection means for detecting a boundary position between non-compressed data and compressed data in the third data sequence read by the input means; and
additional expansion means for expanding only the compressed data that are positioned subsequent to the boundary position detected by the detection means in the third data sequence read by the input means.

15. A data processing method, comprising the steps of:
detecting a compression start position to start compressing data in a first data sequence, the first data sequence having a top portion and a subsequent portion, the compression start position being positioned as a boundary between the top portion and the subsequent portion;
compressing data in the subsequent portion of the first data sequence that are positioned subsequent to the compression start position detected by the detection step; and
generating a second data sequence having a top portion containing data that are positioned ahead of the compression start position in a non-compressed form as contained in the top portion of the first data sequence and a subsequent portion containing subsequent data in a compressed form as compressed by the compression step.

16. A data processing method, comprising the steps of:
reading a data sequence having a top segment containing non-compressed data and subsequent segments containing compressed data that are positioned subsequent to the non-compressed data from a memory;
detecting a boundary position between the non-compressed data and the compressed data in the data sequence read by the reading step;
expanding only the compressed data in the subsequent segments that are positioned subsequent to the boundary position detected by the detection step, while leaving the non-compressed data in the top segment in a non-compressed form as contained in the data sequence read by the reading step; and
generating another data sequence having a top portion containing the non-compressed data that are positioned ahead of the boundary position detected by the detecting step in the data sequence and a subsequent portion containing subsequent data expanded by the expanding step.

17. A data processing method, comprising the steps of:
reading in a first data sequence containing compressed data in at least a top segment and a subsequent segment which are separately compressed;
expanding only the compressed data in the top segment of the first data sequence read by the reading step, the top segment having a top portion containing uncompressed data and a subsequent portion containing the compressed data that was expanded by the expanding step; and
generating a second data sequence having a top portion containing expanded data as expanded by the expanding step and a subsequent portion containing compressed data in a compressed form as contained in the subsequent segment of the first data sequence.

18. A data processing method, comprising the steps of:
(a) detecting a compression start position to start compressing data in a first data sequence, the first data sequence having a top portion and a subsequent portion, the compression start position being positioned as a boundary between the top portion and the subsequent portion;
(b) compressing data in the subsequent portion of the first data sequence that are positioned subsequent to the compression start position detected by the step (a);
(c) generating a second data sequence having a top portion containing data that are positioned ahead of the compression start position in a non-compressed form as contained in the top portion of the first data sequence and a subsequent portion containing subsequent data in a compressed form as compressed by the step (b);
(d) storing the second data sequence generated by the step (c);
(e) reading the second data sequence stored by the step (d);
(f) detecting a boundary position between non-compressed data and compressed data in the second data sequence read by the step (e); and
(g) expanding only the compressed data that are positioned subsequent to the boundary position detected by the step (f), while leaving the non-compressed data in a non-compressed form as contained in the second data sequence read by the step (e).

19. A data processing method, comprising the steps of:
(a) segmenting a first data sequence into at least two segments;
(b) compressing data of said at least two segments separately;
(c) generating a second data sequence containing compressed data of said at least two segments compressed by the step (b);
(d) transferring the second data sequence generated by the step (c);
(e) expanding only the compressed data in a top segment of the second data sequence transferred by the step (d); and
(f) generating a third data sequence having a top portion containing expanded data as expanded by the step (e) and a subsequent portion containing compressed data in a compressed form as contained in the second data sequence.

20. A computer usable medium having a computer readable program code unit for causing a computer to function as a data processing system, the computer readable program code unit comprising:
a first computer readable program code unit that causes said computer to detect a compression start position to start compressing data in a first data sequence, the first data sequence having a top portion and a subsequent portion, the compression start position being positioned as a boundary between the top portion and the subsequent portion;
a second computer readable program code unit that causes said computer to compress data in the subsequent portion of the first data sequence that are positioned subsequent to the compression start position detected by the first computer readable program code unit in the first data sequence; and a third computer readable program code unit that causes said computer to generate a second data sequence having a top portion containing data that are positioned ahead of the compression start position in a non-compressed form as contained in the top portion of the first data sequence and a subsequent portion containing subsequent data in a compressed form as compressed by the second computer readable program code unit.

21. A computer usable medium having a computer readable program code unit for causing a computer to function as a data processing system, the computer readable program code unit comprising:

a first computer readable program code unit that causes said computer to read a data sequence having a top segment containing non-compressed data and a subsequent segment containing compressed data that are positioned subsequent to the non-compressed data from a memory;

a second computer readable program code unit that causes said computer to detect a boundary position between the non-compressed data and compressed data in the data sequence read by the first computer readable program code unit;

a third computer readable program code unit that causes said computer to expand only the compressed data in subsequent segments that are positioned subsequent to the boundary position detected by the second computer readable program code unit, while leaving the non-compressed data in the top segment in a non-compressed form as contained in the data sequence read by the first computer readable program code unit; and a fourth computer readable program code unit that causes said computer to generate another data sequence having a top portion containing the non-compressed data that are positioned ahead of the boundary position detected by the second computer readable program code unit in the data sequence and a subsequent portion containing subsequent data expanded by the third computer readable program code unit.

22. A computer usable readable having a computer readable program code unit for causing a computer to function as a data processing system, the computer readable program code unit comprising:

a first computer readable program code unit that causes said computer to read a first data sequence containing compressed data in at least a top segment and a subsequent segment which are separately compressed;

a second computer readable program code unit that causes said computer to expand only the compressed data in the top segment of the first data sequence read by the first computer readable program code unit, the top segment having a top portion containing uncompressed data and a subsequent portion containing the compressed data that was expanded by the second computer readable portion code unit; and a third computer readable program code unit that causes said computer to generate a second data sequence having a top portion containing expanded data as expanded by the second computer readable program code unit and a subsequent portion containing compressed data in a compressed form as contained in the subsequent segment of the first data sequence.

23. A data processing apparatus, comprising:

detection means for detecting a compression start position to start compressing data in a first data sequence, the first data sequence having a top portion and a subsequent portion, the compression start position being positioned as a boundary between the top portion and the subsequent portion;

compression means for compressing data in the subsequent portion of the first data sequence that are positioned subsequent to the compression start position detected by the detection means; and generation means for generating a second data sequence from data that are positioned ahead of the compression start position in a non-compressed form as contained in the top portion of the first data sequence and subsequent data in a compressed form as compressed by the compression means, wherein the data that are positioned ahead of the compression start position are not used to uncompress the compressed subsequent data that are positioned subsequent to the compression start position.

24. A data processing apparatus, comprising:

input means for reading a data sequence containing non-compressed data and compressed data that are positioned subsequent to the non-compressed data from a memory;

detection means for detecting a boundary position between the non-compressed data and the compressed data in the data sequence read by the input means; and expansion means for expanding only the compressed data that are positioned subsequent to the boundary position detected by the detection means, while leaving the non-compressed data in a non-compressed form as contained in the data sequence read by the input means, wherein the data that are positioned ahead of the boundary position are not used to expand the compressed data that are positioned subsequent to the boundary position.

25. A data processing system, comprising:

segmentation means for segmenting a first data sequence into at least two segments;

compression means for compressing data of said at least two segments separately;

first generation means for generating a second data sequence generated by the first generation means;

expansion means for expanding only the compressed data in a top segment of the second data sequence transferred by the transfer means; and second generation means for generating a third data sequence from top segment data as expanded by the expansion means and compressed data of subsequent segments in a compressed form as contained in the second data sequence, wherein the data that are positioned behind of a boundary position in the top segment are not used to expand the compressed data that are positioned ahead of the boundary position in the top segment.

26. A data processing method, comprising the steps of:

detecting a compression start position to start compressing data in a first data sequence, the first data sequence having a top portion and a subsequent portion, the compression start position being positioned as a boundary between the top portion and the subsequent portion;

compressing data in the subsequent portion of the first data sequence that are positioned subsequent to the compression start position detected by the detection step; and generating a second data sequence from data that are positioned ahead of the compression start position in a non-compressed form as contained in the top portion of the first data sequence and subsequent data in a compressed form as compressed by the compression step, wherein the data that are positioned ahead of the compression start position are not used to uncompress the compressed subsequent data that are positioned subsequent to the compression start position.

27. The computer usable medium having a computer readable program code unit for causing a computer to function as a data processing system, the computer readable program code unit comprising:

a first computer readable program code unit that causes said computer to detect a compression start position to start compressing data in a first data sequence, the first data sequence having a top portion and a subsequent portion, the compression start position being positioned as a boundary between the top portion and the subsequent portion;

a second computer readable program code unit that causes said computer to compress data in the subsequent portion of the first data sequence that are positioned subsequent to the compression start position detected by the first computer readable program code unit; and a third computer readable program code unit that causes said computer to generate a second data sequence from data that are positioned ahead of the compression start position in a non-compressed form as contained in the top portion of the first data sequence and subsequent data in a compressed form as compressed by the second computer readable program code unit, wherein the data that are positioned ahead of the compression start position are not used to uncompress the compressed subsequent data that are positioned subsequent to the compression start position.

* * * * *